United States Patent
Parihar et al.

(10) Patent No.: US 11,269,604 B1
(45) Date of Patent: Mar. 8, 2022

(54) STATIC PERFORMANCE ANALYSIS SERVICE

(71) Applicant: Citrix Systems, Inc., Fort Lauderdale, FL (US)

(72) Inventors: Himanshu Parihar, Pompano Beach, FL (US); Max Aristilde, Boynton Beach, FL (US); Nitin Kumar Mathur, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/349,038

(22) Filed: Jun. 16, 2021

(51) Int. Cl.
   *G06F 9/44*   (2018.01)
   *G06F 8/41*   (2018.01)
   *G06F 11/36*  (2006.01)
   *G06F 8/77*   (2018.01)

(52) U.S. Cl.
   CPC .............. *G06F 8/443* (2013.01); *G06F 8/433* (2013.01); *G06F 8/77* (2013.01); *G06F 11/3612* (2013.01)

(58) Field of Classification Search
   None
   See application file for complete search history.

(56) References Cited

U.S. PATENT DOCUMENTS

| | | | | |
|---|---|---|---|---|
| 8,396,788 B2* | 3/2013 | Anke | ................... | G06F 9/5066 705/38 |
| 9,923,960 B2* | 3/2018 | Helmich | ................. | G06F 16/25 |
| 2011/0258617 A1* | 10/2011 | Park | .................... | G06F 11/3636 717/157 |
| 2013/0125087 A1* | 5/2013 | Trautmann | .............. | G06F 8/443 717/104 |
| 2018/0124545 A1* | 5/2018 | Mahata | ............... | G06F 11/3452 |
| 2020/0401386 A1* | 12/2020 | Punathil | ................. | G06F 8/433 |

* cited by examiner

*Primary Examiner* — Qamrun Nahar
(74) *Attorney, Agent, or Firm* — Hoffman Warnick LLC

(57) ABSTRACT

A system and method for analyzing a performance of computer code. A method includes scanning a graph to identify a plurality of calls to executable code, individual nodes of the graph representing different calls to be taken by the executable code; determining a score for individual nodes of the graph based on resources required to perform the call represented by that node, the call being one that consumes substantial resources of a computing system to accomplish an operation; adjusting the score of individual nodes that are associated with repetitive action nodes in the graph; and generating recommendations to improve performance of the computer code based on scores indicative of substantial resource consumption.

20 Claims, 5 Drawing Sheets

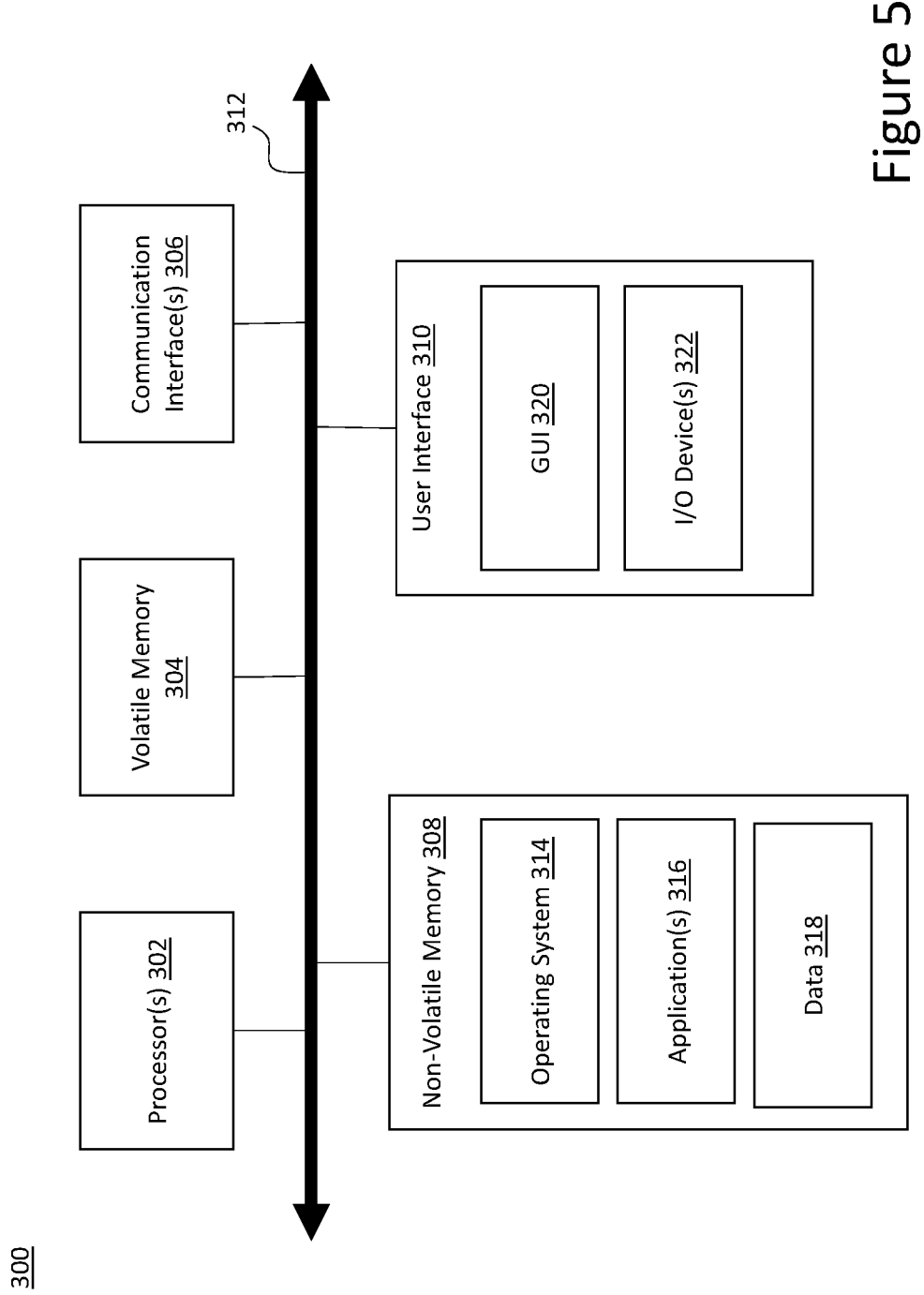

STATIC PERFORMANCE ANALYSIS SERVICE

BACKGROUND OF THE DISCLOSURE

As software applications become larger and more complex, it is not unusual for developers to share and reuse previously written code. This approach can greatly reduce the time and cost of developing a new application, as common routines and operations need not be recreated from scratch. In addition, it is also commonplace to have different aspects of the application written by different developers, thus reducing the development time by allowing the different code segments to be created in parallel.

BRIEF DESCRIPTION OF THE DISCLOSURE

Aspects of this disclosure provide a system and method for statically evaluating computer code for potential performance issues and generating recommendations.

A first aspect of the disclosure provides a system that includes a memory and a processor coupled to the memory and configured to provide a performance analysis of computer code. The process includes scanning a graph to identify a plurality of calls to executable code, individual nodes of the graph representing different calls to be taken by the executable code and determining a score for individual nodes of the graph based on resources required to perform the call represented by that node, the call being one that consumes substantial resources of a computing system to accomplish an operation. The process further includes adjusting the score of individual nodes that are associated with repetitive action nodes in the graph and generating recommendations to improve performance based on scores indicative of substantial resource consumption.

A second aspect of the disclosure provides a computerized method to provide a performance analysis of computer code. The method includes: scanning a graph to identify a plurality of calls to executable code, individual nodes of the graph representing different calls to be taken by the executable code, and determining a score for individual nodes of the graph based on resources required to perform the call represented by that node, the call being one that consumes substantial resources of a computing system to accomplish an operation. The method further includes adjusting the score of individual nodes that are associated with repetitive action nodes in the graph; and generating recommendations to improve performance of the computer code based on scores indicative of substantial resource consumption.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 depicts a computing system, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure include technical solutions for analyzing computer code for potential performance issues. Given the large codebase size of software applications, it is not unusual for developers to inadvertently introduce performance issues associated with calls that consume substantial computing resources, such as network input/output (IO) operations, disk IO operations, database transactions, memory allocations, etc. Such operations may for example be repeatedly called in nested loops or the like that further exacerbate the performance degradation at runtime. Unfortunately, catching such issues during code review can be difficult since the created code may technically perform the desired result. Often the performance issues do not become apparent until the application is runtime tested and/or put into production, when the frequency and impact of calls involving computationally intensive activities become apparent. At that point, identifying the root cause can be difficult as a poorly written code segment can impact numerous other areas of the application.

Aspects of the present disclosure address these issues with a static performance analysis service that can identify potential performance issues early in the software development cycle. The service is configured to analyze source code to identify calls that potentially consume substantial computing resources. In particular, one or more call graphs, each representative of a method, are evaluated and scored. The call graph scores can be used to help determine a relative performance impact for different calls in the call stack. This information can, e.g., assist the developer in optimizing the code prior to deployment of the application. In certain embodiments, the scores are used as input to an automated system that can, e.g., output code change recommendations, reconfigure the code, alert the coder of potential issue within an integrated development environment (IDE), etc.

Figure 1:
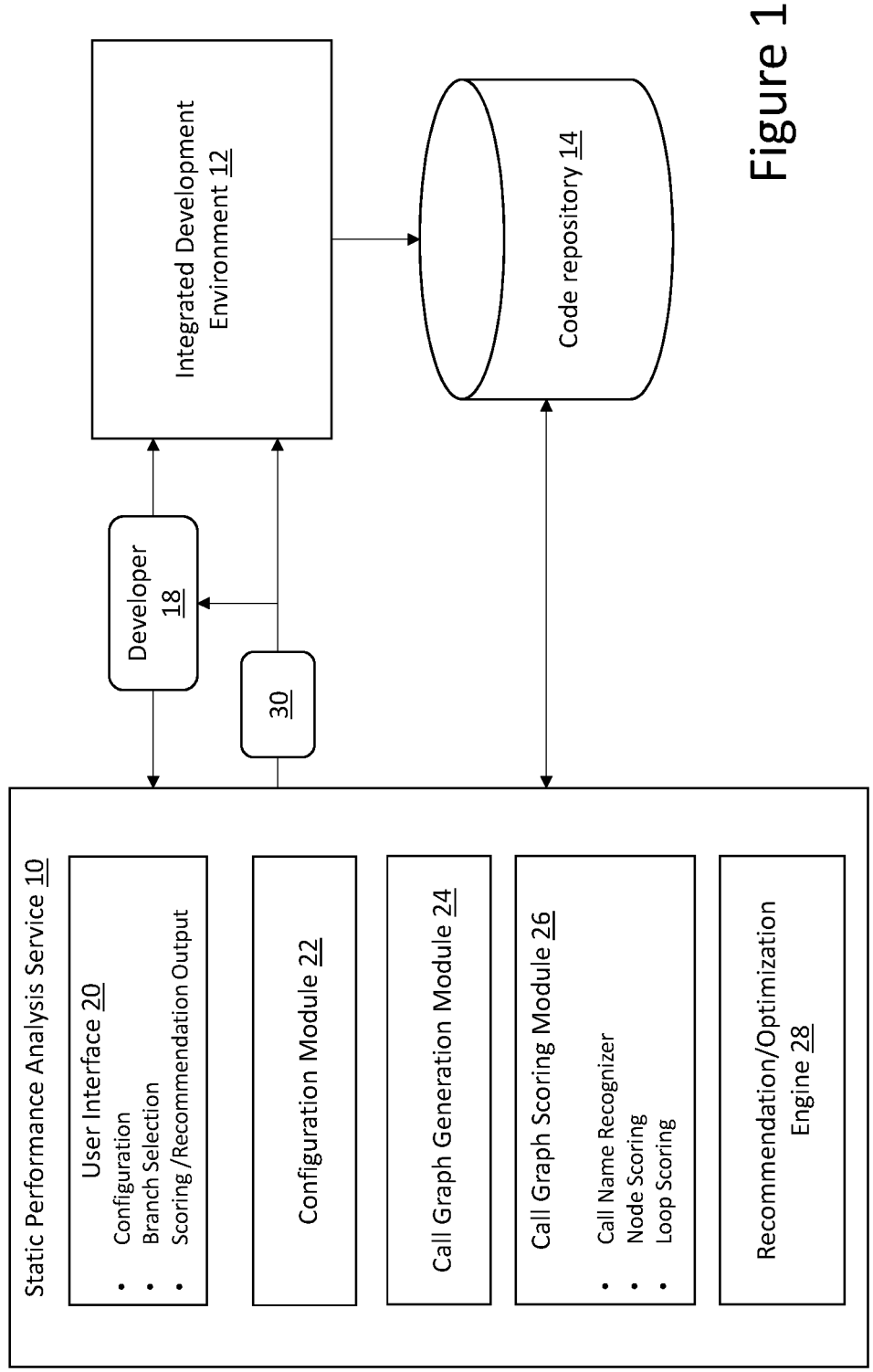
FIG. 1 depicts a static performance analysis service, in accordance with an illustrative embodiment.

FIG. 1 an illustrative implementation of a static performance analysis service 10 that is configured to assess and analyze code segments stored in code repository 14. In some aspects, the static performance analysis service 10 generates a call graph with performance scores for individual method calls using an application program interface (API). Based on the performance scores, the service 10 can generate an output 30 that, e.g., includes recommendations for the developer 18 to optimize specific area of the code. Service 10 can be utilized for newly written code, as well as to score methods in an existing codebase. In some cases, service 10 may use a single sign-on (SSO) process to clone the repository 14 from a version control system, such as GIT, to create a back-up or remote repository.

In the embodiment shown, developer 18 creates code, e.g., in an integrated development environment 12 or other platform, and stores the code in a code repository 14. When the developer 18 (or other user) want to have the code analyzed, service 10 can be launched and the developer 18 is presented with a user interface 20 that allows the developer to configure analysis details, select which branch or branches are to be analyzed, and view scoring and recommendation outputs.

Configuration details are managed with the configuration module 22, which may involve a one-time project setup in which the repository name, repository URL, coding language for the specific project, etc., are specified. Configuration module 22 may store the configuration details so that the developer 18 can readily refer to the same project for future analysis.

As noted, from the user interface 20, the developer 18 can specify which portion of the code should be analyzed. Code analysis can be done on many levels, e.g., class, method, branch, etc. For example, if a branch is specified, then all the classes and methods in the code base are analyzed. If only a class name is provided, then all the methods in the class are analyzed. If a method name is specified, then only that method is analyzed.

For each project, service 10 is also configured with a set of low level method names used in the code that are associated with methods that perform computationally intensive operations. For example, method names dbm1 and dbm2 may be method names used to perform database calls, dm1 and dm2 may be method names that perform disk IO, nwm1 and nwm2 may be method names that perform network IO, etc.

Once the code segment to be analyzed is specified, call graph generation module 24 generates a call graph for each method contained in the specified portion. A call graph is a representation of breadthwise and depth-wise calls of a method, and numerous tools exist for generating a call graph from a method. For example, code-coverage tools in Java generate and utilize call graphs to compute code coverage of a unit test. A call graph generally comprises a directed graph that shows relationships between called and calling subroutines in a computer program. Each node represents a procedure and each edge indicates which calling procedure calls a called procedure. The call graph may also include repetitive action nodes such as loops and other cyclic or repeating constructs from which calls may be made.

Once the call graphs are generated, call graph scoring module 26 is implemented to evaluate each graph, look for method names associated with computationally intensive operations in each graph, assign scores to individual nodes and generate a call graph score. While computing the call graph score, the scoring module 26 assigns a score to each node of the graph. In some implementations, a score is assigned only if the method is doing a specified costly operation. In other implementations, all nodes are scored. Different types of operations may be assigned different scores. For example, in an illustrative scoring model, if the method is doing a database operation a score of "10" is assigned to the node, if the method is doing a network IO, a score of "9" is assigned to the node, if the method is doing a disk IO, a score of "8" is assigned to the node, etc. Scores may be determined in any manner for different operations. In a simple case, scores for different types of operations may be static, e.g., determined based on experience of an expert. For example, the following table may be used to score nodes:

| Operation Name | Call Type | Score |
|---|---|---|
| dbm1 | Database Operation | 10 |
| dbm2 | Database Operation | 10 |
| nwm1 | Network Operation | 9 |

-continued

| Operation Name | Call Type | Score |
|---|---|---|
| nwm2 | Network Operation | 9 |
| dm1 | IO Operation | 8 |
| dm2 | IO Operation | 8 |

In a more advanced cases, scores can be periodically or dynamically updated based on runtime analytics of the current or other applications. For instance, if for a particular platform it is determined that network IO is 30% slower that a database IO, then the scores can be adjusted so the network IO scores are 30% higher than the database IO scores.

In addition to assigning scores to nodes in each graph, scoring module 26 can also adjust node scores when repetitive action such as when a loop node or set of nested loop nodes are involved. For example, module 26 could assign a multiplier factor, e.g., 2×, for each loop node in a method. If nested loops are present, the multiplier factor is the exponential value of the level of nesting. For example, if two levels of nesting are present, the multiplier factor would be 4×. Thus, if a loop contains one of the identified intensive operations, then the node's score is multiplied by the multiplier factor. For example, if two levels of a nested loop contain a node that performs a database call (which has a score of 10), then total score for the node would be: (2^2)*10=40.

Once generated, the scores can be provided to the developer 18 via user interface 20. For class and method level analysis, the service 10 can generate a call score graph with scores at each level of calls. In this case, the scored call graphs can be used to exactly identify which calls in the call stack are the most expensive.

In certain embodiments, a recommendation/optimization engine 28 may be utilized to provide a more enhanced output 30. For example, engine 28 could be used to generate a list of code optimization recommendations. In some embodiments, recommendations may be ranked such that the higher the score for a particular operation in a method call, the higher up on the list it will appear. Illustrative recommendations can provide score details of a specific method with potential improvements to, e.g., reduce network calls, database calls etc. In certain cases, engine 28 could also recommendations to, e.g., (1) use caching, (2) reduce code complexity by, for example, moving costly operation outside a loop, (3) avoid calling a method repeatedly, etc.

In certain approaches, engine 28 may generate proposed pseudo code to replace actual code segments. In some cases, optimization to the code may be made automatically in a new separate code version that the developer can review and adopt. In other cases, recommendations or optimizations can be communicated to the integrated development environment 12 while the developer is writing and/or viewing code.

Recommendations can be generated in any manner. In one illustrative embodiment, if a score for a method exceeds a threshold value, then a set of rules may be deployed to evaluate the call graph and/or actual code segment to identify issues and recommend changes. For instance, if there is node embedded in a set of nested loops that has a high score, a code analyzer may be deployed to determine if the node can be removed from one or more loops to achieve the same functionality. In such a case, the engine 28 may generate a proposed code change. In other case, engine 28 may point to a tutorial or illustrative examples that demonstrate how to potentially alleviate the issue.

Figure 2:
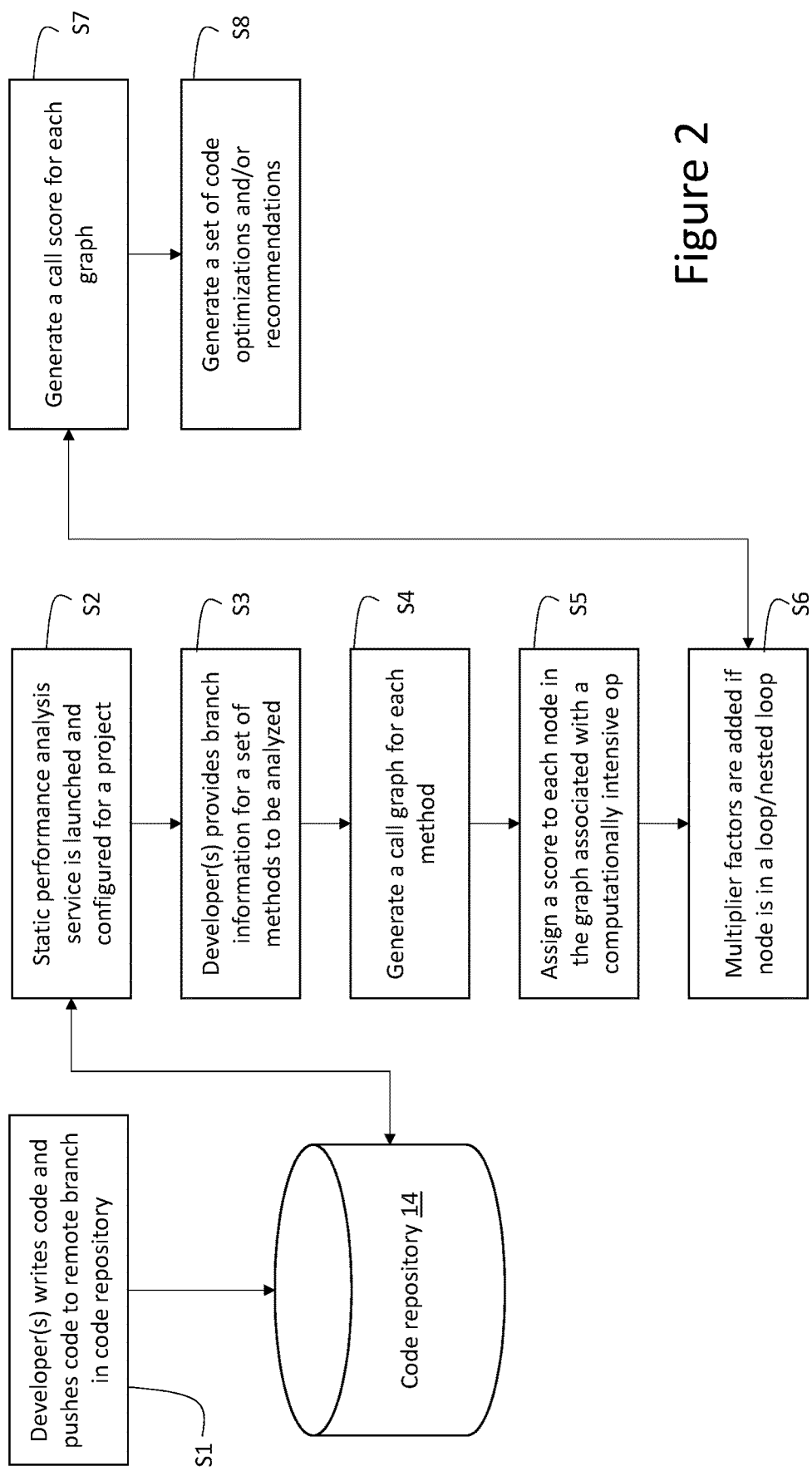
FIG. 2 depicts a flow diagram of a process of implementing a static performance analysis service, in accordance with an illustrative embodiment.

FIG. 2 depicts a flow diagram of an illustrative process of implementing the service 10 (with reference to FIG. 1). At S1, the developer writes code and pushing the code to a remote (e.g., sharable) branch in the code repository 14. At S2, the static performance analysis service 10 is launched. If the project is a new project, the interface may ask for necessary configuration details. At S3, the developer (or some other person) provides branch information specifying which code segment, i.e., methods to be analyzed, e.g., via user interface 20. At S4, a call graph is generated for each method and at S5 a score is assigned to each node that is associated with a computationally intensive operation. At S6, multiplier factors are added to the graphs if repetitive action nodes such as a loop or nested loops are identified. At S7, a call graph score is generated and outputted for each graph and at S8, code optimizations and/or recommendations are also outputted by the service 10.

Figure 3:
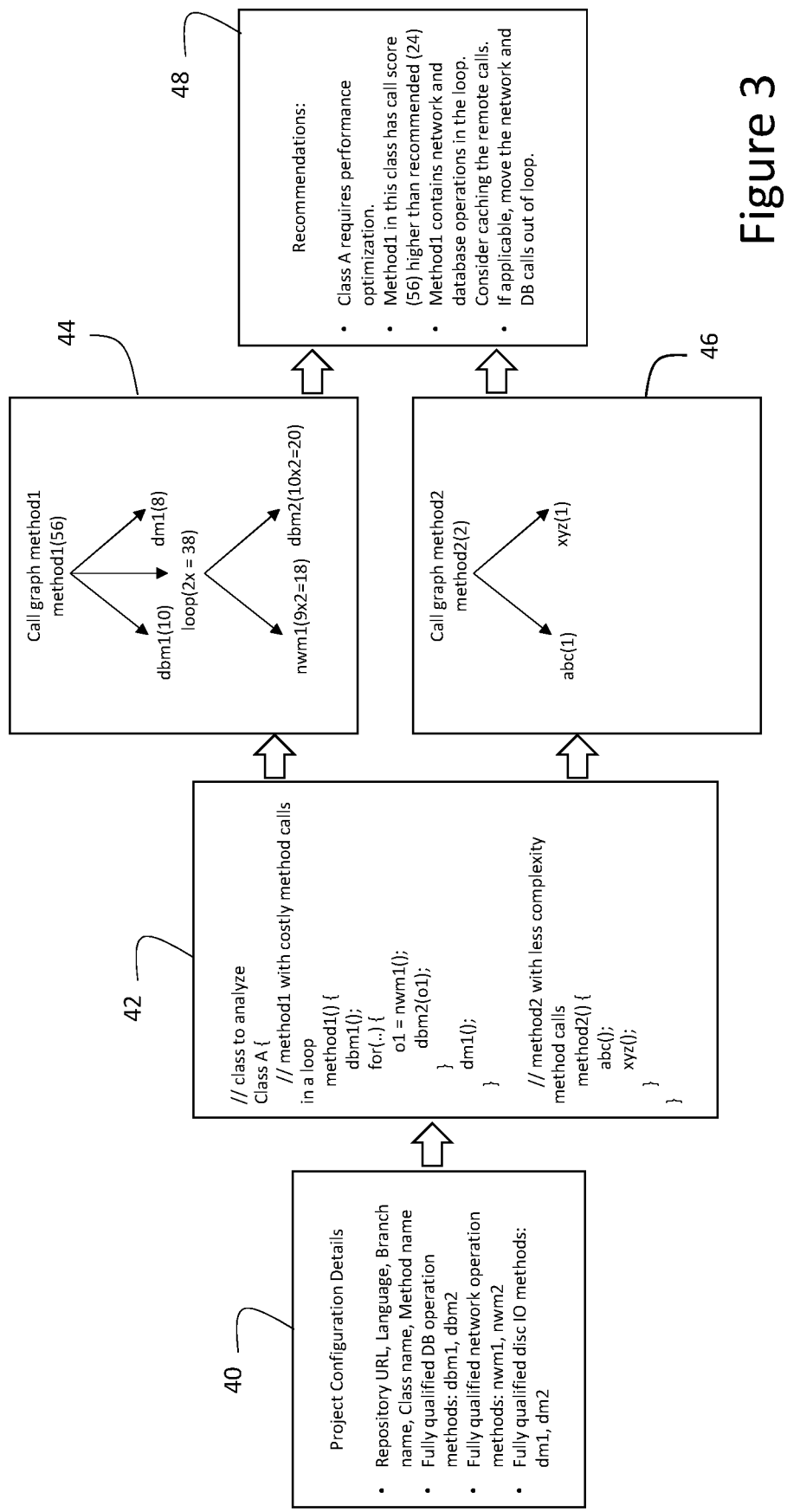
FIG. 3 depicts an example of analyzing a code segment, in accordance with illustrative embodiments.

FIG. 3 depicts an illustrative example of an implementation of service 10. In this example, a set of project configuration details are first specified, which include, e.g., the Repository URL, Language the code is written in, a Branch name, a Class name, and Method names. Additionally, fully qualified database (DB) operation method names: dbm1, dbm2; fully qualified network operation method names: nwm1, nwm2; and fully qualified disk IO methods names: dm1, dm2 are specified, e.g., in a table as provided above. Based on the configuration details 40, a code segment 42 that includes Class A containing method1 and method2 are analyzed. Call graphs 44, 46 for the two method are then generated and scored.

As shown in the call graph 44, method1 calls dbm1, which is assigned a score of 10, and dm1, which is assigned a score of 8. Additionally, a loop node is provided that includes nwm1 that is assigned a score of 9 and dbm2 that receives a score of 10. In this case, the loop is not a nested loop so it receives a multiplier factor of 2×, which increase the node scores, e.g., nwm1=9×2=18 and dbm2=10×2=20. In this example, the total loop score is 38, i.e., a sum of both 18+20. The call graph score for method1 is thus 56, i.e., 10+38+8. The call graph for method2 contains two calls abc and xyz, which were not designated as computationally intensive operations. In this example, they are each assigned a nominal value of 1, so the call graph score for method2 is 2.

Based on the call graph scores, a set of recommendations 48 are also generated. Example recommendations include:
Class A requires performance optimization.
  Method1 in this class has call score (56) higher than recommended (24).
  Method1 contains network and database operations in the loop. Consider caching the remote calls.
  If applicable, move the network and DB calls out of loop.

Figure 4:
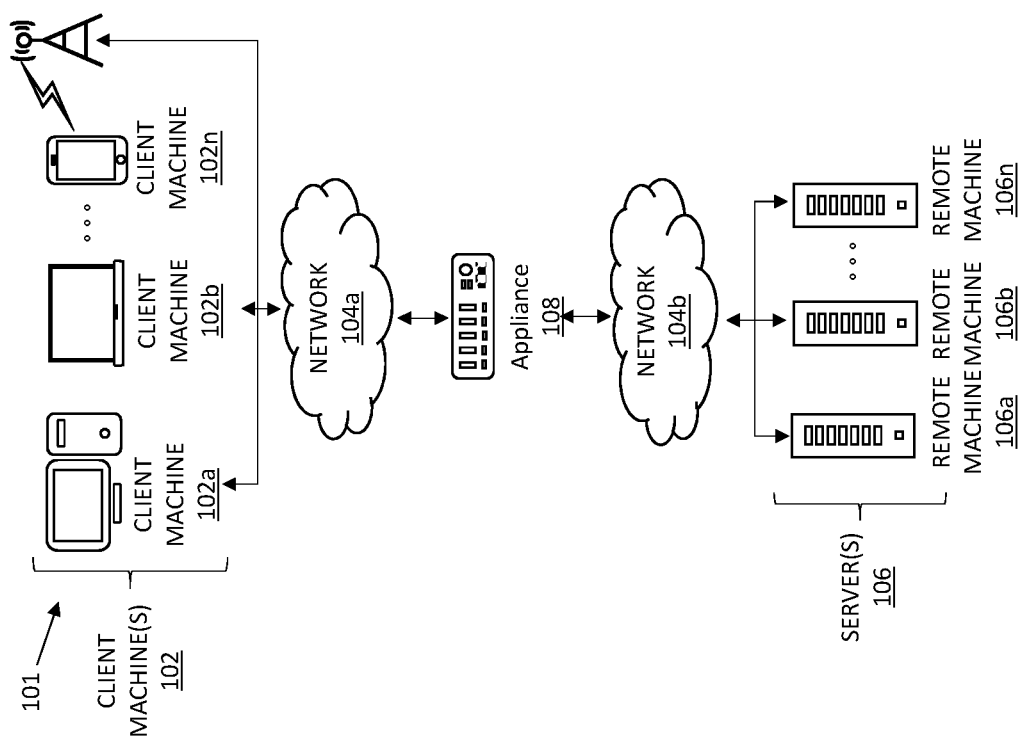
FIG. 4 depicts a network infrastructure, in accordance with an illustrative embodiment.

Referring to FIG. 4, a non-limiting network environment 101 in which various aspects of the disclosure may be implemented includes one or more client machines (or "devices") 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Elements of the described solution may be embodied in a computing system, such as that shown in FIG. 5 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 5 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The following paragraphs (S1) through (S10) describe examples of a system that may be implemented in accordance with the present disclosure.

(S1) A system, comprising a memory; and a processor coupled to the memory and configured to provide a performance analysis of computer code, including: scanning a graph to identify a plurality of calls to executable code, individual nodes of the graph representing different calls to be taken by the executable code; determining a score for individual nodes of the graph based on resources required to perform the call represented by that node, the call being one that consumes substantial resources of a computing system to accomplish an operation; adjusting the score of individual nodes that are associated with repetitive action nodes in the graph; generating recommendations to improve performance based on scores indicative of substantial resource consumption.

(S2) The system of (S1), wherein calls that consume substantial resources include database calls, disk input/output (IO) calls, memory allocations and network IO calls.

(S3) The system of any of (S1)-(S2), wherein calls that consume substantial resources are identified by evaluating call names.

(S4) The system of any of (S1)-(S3), wherein repetitive action nodes include loop nodes, and the score for a given node associated with at least one loop node is adjusted by multiplying the score with a multiplier value for each loop within which the given node resides.

(S5) The system of any of (S1)-(S4), wherein the graph score is a sum of all of the scores in a call graph.

(S6) The system of any of (S1)-(S5), wherein the processor further generates at least one graph from the computer code.

(S7) The system of any of (S1)-(S6), wherein the processor further includes receiving as input a specified portion of the computer code to be analyzed, wherein the specified portion includes one of a method, a class or a branch.

(S8) The system of any of (S1)-(S7), wherein the computer code includes source code stored in a code repository.

(S9) The system of any of (S1)-(S8), wherein the score for each node is commensurate with a cost to execute each associated call during runtime.

(S10) The system of any of (S1)-(S9), wherein generating recommendations includes outputting proposed modifications to the computer code.

The following paragraphs (M1) through (M10) describe examples of methods that may be implemented in accordance with the present disclosure.

(M1) A computerized method to provide a performance analysis of computer code, the method comprising: scanning a graph to identify a plurality of calls to executable code, individual nodes of the graph representing different calls to be taken by the executable code; determining a score for individual nodes of the graph based on resources required to perform the call represented by that node, the call being one that consumes substantial resources of a computing system to accomplish an operation; adjusting the score of individual nodes that are associated with repetitive action nodes in the graph; and generating recommendations to improve performance of the computer code based on scores indicative of substantial resource consumption.

(M2) A method may be performed as described in paragraph (M1), wherein calls that consume substantial resources include database calls, disk input/output (IO) calls, memory allocations and network IO calls.

(M3) A method may be performed as described in paragraph (M1)-(M2), wherein the graph includes a call graph and calls that consume substantial resources are identified by evaluating call names.

(M4) A method may be performed as described in any of paragraphs (M1)-(M3), wherein repetitive action nodes include loop nodes, and the score for a given node associated with at least one loop node is adjusted by multiplying the score with a multiplier value for each loop within which the given node resides.

(M5) A method may be performed as described in any of paragraphs (M1)-(M4), wherein a total graph score is a sum of all of the scores in the graph.

(M6) A method may be performed as described in paragraph (M1)-(M5), further comprising generating at least one graph from the computer code.

(M7) A method may be performed as described in paragraph (M1)-(M6), further including receiving as input a specified portion of the computer code to be analyzed, wherein the specified portion includes one of a method, a class or a branch.

(M8) A method may be performed as described in any of paragraphs (M1)-(M7), wherein the computer code includes source code stored in a code repository.

(M9) A method may be performed as described in any of paragraphs (M1)-(M8), wherein the score for each node is commensurate with a cost to execute each associated call during runtime.

(M10) A method may be performed as described in any of paragraphs (M1)-(M9), wherein generating recommendations includes outputting proposed modifications to the computer code.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system, comprising:
   a memory; and
   a processor coupled to the memory and configured to provide a performance analysis of computer code, including:
   scanning a graph to identify a plurality of calls to executable code, individual nodes of the graph representing different calls to be taken by the executable code;
   determining a score for individual nodes of the graph based on resources required to perform the call represented by that node, the call being one that consumes substantial resources of a computing system to accomplish an operation;
   adjusting the score of individual nodes that are associated with repetitive action nodes in the graph; and
   generating recommendations to improve performance of the computer code based on scores indicative of substantial resource consumption.

2. The system of claim 1, wherein calls that consume substantial resources include database calls, disk input/output (IO) calls, memory allocations and network IO calls.

3. The system of claim 1, wherein the graph includes a call graph and calls that consume substantial resources are identified by evaluating call names.

4. The system of claim 1, wherein repetitive action nodes include loop nodes, and the score for a given node associated with at least one loop node is adjusted by multiplying the score with a multiplier value for each loop within which the given node resides.

5. The system of claim 4, wherein a graph score is a sum of all of the scores in the graph.

6. The system of claim 1, wherein the analysis further includes generating at least one graph from the computer code.

7. The system of claim 1, wherein the analysis further includes receiving as input a specified portion of the computer code to be analyzed, wherein the specified portion includes one of a method, a class or a branch.

8. The system of claim 1, wherein the computer code includes source code stored in a code repository.

9. The system of claim 1, wherein the score for each node is commensurate with a cost to execute each associated call during runtime.

10. The system of claim 1, wherein generating recommendations includes outputting proposed modifications to the computer code.

11. A computerized method to provide a performance analysis of computer code, the method comprising:
    scanning a graph to identify a plurality of calls to executable code, individual nodes of the graph representing different calls to be taken by the executable code;
    determining a score for individual nodes of the graph based on resources required to perform the call represented by that node, the call being one that consumes substantial resources of a computing system to accomplish an operation;
    adjusting the score of individual nodes that are associated with repetitive action nodes in the graph; and
    generating recommendations to improve performance of the computer code based on scores indicative of substantial resource consumption.

12. The method of claim 11, wherein calls that consume substantial resources include database calls, disk input/output (IO) calls, memory allocations and network IO calls.

13. The method of claim 11, wherein the graph includes a call graph and calls that consume substantial resources are identified by evaluating call names.

14. The method of claim 11, wherein repetitive action nodes include loop nodes, and the score for a given node associated with at least one loop node is adjusted by multiplying the score with a multiplier value for each loop within which the given node resides.

15. The method of claim 14, wherein a graph score is a sum of all of the scores in the graph.

16. The method of claim 11, further comprising generating at least one graph from the computer code.

17. The method of claim 11, further including receiving as input a specified portion of the computer code to be analyzed, wherein the specified portion includes one of a method, a class or a branch.

18. The method of claim 11, wherein the computer code includes source code stored in a code repository.

19. The method of claim 11, wherein the score for each node is commensurate with a cost to execute each associated call during runtime.

20. The method of claim 11, wherein generating recommendations includes outputting proposed modifications to the computer code.

* * * * *